April 16, 1968          D. E. BULL          3,378,748
SPEED REGULATING SYSTEM INCLUDING A RECTIFIER BRIDGE WITH
A CONTROLLED RECTIFIER CONNECTED FROM ITS POLES
Filed June 14, 1965
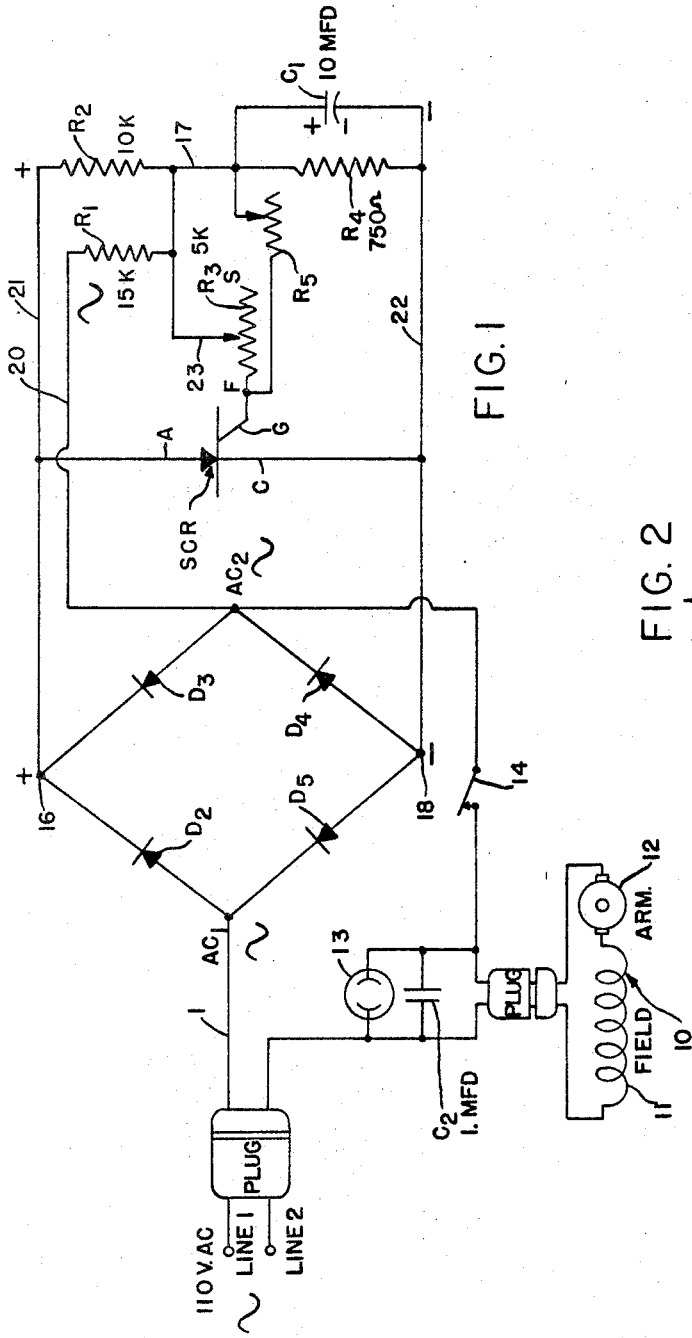
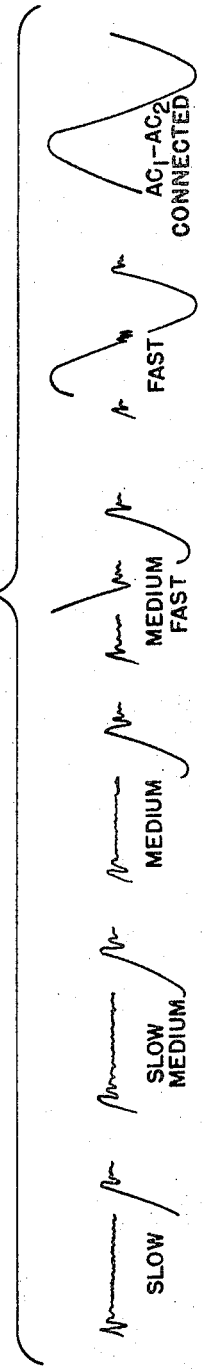
INVENTOR.
DONALD E. BULL
BY
ATT'Y.

United States Patent Office 3,378,748
Patented Apr. 16, 1968

3,378,748
SPEED REGULATING SYSTEM INCLUDING A RECTIFIER BRIDGE WITH A CONTROLLED RECTIFIER CONNECTED FROM ITS POLES
Donald E. Bull, Northlake, Ill., assignor to Webcor, Inc., Chicago, Ill., a corporation of Illinois
Filed June 14, 1965, Ser. No. 463,517
11 Claims. (Cl. 318—345)

ABSTRACT OF THE DISCLOSURE

A speed regulator for an inductive load in which a full-wave rectified signal and an alternating current or half-wave rectified signal connected to one of the terminals of the load are applied through parallel connections to the gate of a silicon controlled rectifier through a variable resistance to control the power current through the anode-cathode terminals connected across the full-wave rectified current potential.

The present invention relates generally to the automatic control of electrically operated inductive devices by intermittently interrupting the electrical power current supplied to the devices in relationship to their load and speed and more particularly to an improved load-speed governor for motor driven household appliances.

Many different arrangements, including the use of semiconductors, have been pursued heretofore to regulate the speed of fractional horsepower universal motors such as used in household appliances. Efforts have met with some success where several semiconductors have been used with their many asociated impedances, capacitances and circuits, but difficulty has been experienced in both varying the speed of different motors at will and maintaining the speed while the load varies with a single motor.

The use of two or more semiconductors in addition to bridge rectifiers has also been associated with only a portion of a universal motor circuit, such as the armature, and accordingly must be internally connected in the motor circuit for operation. Other uses of semiconductors involve a varying of the power current or a portion thereof in relation to voltage change or in an arrangement in which substantial heat develops or additional current is required.

The present invention is characterized in the use of only one conventional solid state controlled rectifier such as a silicon controlled rectifier. It is connected in series with both the armature and field of the motor to avoid any requirement of additional current and is controlled with a source of pulsing voltage that is constantly active. Each pulse has a null point which is below and a pulse power factor which is above the firing threshold of the gate for bistable switching of the power current supplied to the motor. Furthermore, whenever the gate is fired, the switching is accomplished quickly with minimum development of heat. More particularly, switching to nonconductivity is continuously repeated at the null points at regular intervals, namely, twice every cycle of a 60 cycle applied alternating current. Immediately following each null point, the current interruption is variably extended until the quantum of current that is not required to maintain the motor speed at various speeds and under varying loads is rejected whereupon the gate is fired to provide, during the remainder of the pulse, the quantum of power current that is required.

The inventive concept is to supply to a variable speed motor the power current for which it is designed such as alternating current or full wave rectified direct current and provide a composite signal current of proportionally varying alternating current and full wave rectified direct current for the control of a motor speed governing circuit in which a solid state controlled rectifier is regularly fired for conductivity and returned to nonconductivity each half cycle in relation to the reciprocal of the power required by the motor to maintain an adjustably set speed under varying load.

An object is to interrupt the flow of power current for varying time intervals to remove from application to the motor those increments of electrical power which otherwise would cause the motor to increase its speed above that selected.

The control arrangement of the invention is also characterized by responding to the overall status or operation of an inductive device whereby embodiments thereof may serve as a plug-in control for several different motors as well as being a unit which can be compacted and built into the housing of a single motor.

A further object of the invention is to locate the interruption of conductivity of a solid state controlled rectifier at points close to the null points of the wave pattern irrespective of where on the wave pattern the current flow is restored. This increases the life of the semiconductor junctions, reduces measurably the heat that otherwise would develop, assists in rendering the system nonconductive when it has no current to conduct thereby minimizing inductive surge reactions and reducing the signal increments requirements for turning an S.C.R. from "on" to "off" conductivity, and supplies substantially full electrical power at high speeds.

The invention is also characterized by the simplicity of the circuit and the conventionality of component parts that can be used, the signal current being steady and low enough that ½ watt resistors and a single 25 v. capacitor can be employed.

The invention contemplates a proportional use of an alternating current superposed on a preferably positive full wave rectified current at a common connection to provide a composite positive substantially half wave signal which has two null points each A.C. cycle, with the signal applied to the gate of the S.C.R. through a variable resistor. Thus, the gate is cut "off" at each null point. This signal current is modified by a capacitor charge and discharge factor interconnecting the juncture and the negative side of the rectified current in parallel with the anode-cathode junction of the S.C.R. Charging and discharging time of the capacitor delays the firing of the S.C.R.

More particularly, the current for charging the capacitor during nonconductivity, passes through the motor which develops a counter electromotive force due to continuing armature rotation initiated during conductivity of the S.C.R. This counter E.M.F. operates as an impedance restricting the flow of capacitor charging current. The faster the armature speed is, the gerater the impedance and the less the charging and discharging and the shorter will be the "off" condition of the S.C.R. switching signal. Regardless of discharge time, the capacitor completely discharges at the next null point through its associated resistor ready for the next cycle.

Other and further advantages, objects, characteristics and the results will become apparent including the simplicity, low cost, easy assembly and small size of the component provided by unitizing the circuit and arrangement embodying the invention which will now be described in connection with the accompanying drawings in which FIG. 1 is a schematic diagram of a circuit embodying the invention with only one triple junction semi-conductor therein.

FIG. 2 represents the A.C. current flow pattern as it exists across the motor itself.

The circuit embodying the invention is shown in FIG. 1 in which a universal fractional horsepower motor shown at 10, a manual switch 14, and a rectifier bridge 16 are serially connected between the terminals line 1 and line 2 of a single phase 110 v. alternating current source. The motor includes a series wound field 11 and armature 12 shunted by a filtering capacitor C2 and a neon lamp 13. The manual switch 14 is a conventional "on-off" switch. The rectifier bridge employs a four-diode loop 15 that provides two alternating current input terminals A.C. 1 and A.C. 2 and two poles 16 and 18 delivering full wave rectified direct current of opposite polarity, namely positive and negative, respectively. Diodes D2 and D3 are oriented to conduct two sine wave portions of the alternating current as positive components to the positive pole 16 (plus sign) and diodes D4 and D5 are oriented to conduct the reciprocal of the same two sine wave portions to the negative pole 18 (minus sign).

Assuming for purposes of explanation that a connection is made between poles 16 and 18, A.C. current will flow at A.C. 1 and A.C 2 as though the connection were made therebetween, yet positive full wave rectification is provided at pole 16 and negative full wave rectification is provided at pole 18 for use in the control circuit.

The control circuit includes a solid state controlled rectifier identified as S.C.R. with its anode A connected to the positive pole 16 and its cathode C connected to the negative pole 18. The gate G of the S.C.R. is connected serially through a variable resistor R3 to a common connection 17 and other elements of the circuit as follows: Resistor R1 is connected to connection A.C. 2 by connector 20; resistor R2 is connected by connector 21 to the anode A and to the positive pole 16; and resistor R4 is connected by connector 22 to the cathode C and the negative pole 18. An electrolytic capacitor C1 bridges resistor R4 to provide a timing function, preferably with an approximate resonance of not less than 120 c.p.s. and the settings of the slide 23 of the resistance R3 for fast and slow motor speeds are indicated by F and S respectively. The preferred values of the elements are appropriately indicated for a specific embodiment of the invention.

It will be observed that when the switch 14 is closed, current will flow between line 1 and line 2 through resistor R1 and R2 in parallel to the common connection 17 and in series therefrom through R4 and the motor 10. The current through R1 is unrectified alternating current and the current through R2 is full wave rectified positive current. One of the halves of the A.C. alternating current conducted by conductor 20 is negative and this negative portion will neutralize one of the positive pulses of the rectified D.C. current carried by connector 21 and resistor R2. This will provide a connector 17a substantially half wave rectification signal at least 120 null points per second and 60 positive pulses per second under resting conditions.

Assuming for a moment that switch 14 is closed and resistors R3 and R5 are open, then it will be observed that under the substantial current flow through resistor R4 induced by proportional current flow through resistances R2 and R4 during the "off" cycle of the S.C.R., the capacitor C1 will charge and discharge to some extent each half cycle. Resistor R4 will always conduct. However, the capacitor is assured full discharge each null point. While the capacitor is taking current from the common connection and when it is discharging its effect is inherently "negative" upon the common connection.

When the slider 23 is brought into engagement with the resistor R3 at the slow speed end thereof S this applies to resistor R3 and gate G the proportional current delivered through resistors R1 and R2 as modified by the negative effect of the capacitor C. and resistor R4. However, since the impedance of R3 is resistivity quite high the rectified D.C. pulse effect of current through R1 becomes dominant although of reduced amplitude.

The capacitor C1 being discharged at the null points of the cycles begins to be charged immediately following each null point and the resistor R4 being relatively low, the capacitor and resistor constitute a relatively heavy drain away from resistor R3 through the motor.

This charging and drain effect of the C1–R4 elements delays the attainment of the positive pulse peak that is effective through the resistor R3 to render the S.C.R. conductive in relation to the current drain through the motor when the S.C.R. is nonconductive.

As soon as a portion of the pulse triggers the gate G, the S.C.R. becomes instantly conductive, shunting substantially all current flow away from the resistors R1, R2 and R4 and permitting the capacitor to reverse its polarity and in relation to its degree of charge to continue a negative bias on the slider cancelling for a longer period of time whatever positive bias might be exerted upon the gate G and thereby holding the S.C.R. nonconductive. At low speeds, the positive pulse period may only be once a cycle.

After the motor starts to run, a counter electromotive force is developed like a generator current of reverse polarity when the S.C.R. is nonconductive. Also, a well known counter electromotive force is present when the S.C.R. is conducting. These two forces vary in a pulsing way with the "on" and "off" flow of forward current and to the extent they are able to impede the forward flow of current. A capacitor of 1 mfd. C2 across the motor filters the counter E.M.F. so that a substantially steady electromotive force relation exists with the elimination of peak currents and the reduction of other transients. Counter E.M.F., as used here, means the composite impedance effect upon the forward E.M.F., including commutation noise, and the inductive reactions of the relative current variances occurring 120 times regularly each second, essentially as related to a resultant current potential as a quantum of electrical power.

Noting that counter E.M.F. at any given speed is a substantially constant factor where the load and forward current interruption is regular, it is also to be noted that it increases with forward current speed increases and decreases with increases of load. The increase of current for speed is a factor that is manually controlled while the increase of current supplied for load increase is controlled automatically.

In doing this, the charge of capacitor C1 is related to the current passing through the sensing circuit. This current, although pulsing, involves a lessening quantum or potential as the counter E.M.F. increases. Such constitutes an increasing sensitive effect between the capacitor C1 and line 2 when the S.C.R. is nonconducting thereby shortening or lowering the ultimate negative charge and release effect of the capacitor upon the gate to keep it nonconducting.

In event a speed is set and the load increases, counter E.M.F. decreases; more current flows through the sensing circuit during S.C.R. nonconductive time of the capacitor. This increases the potential across the resistances R1, R2 and R4, and although the capacitor C1 might tend to develop a longer negative effect regarding the common connection 17, the resistance being greater across R1 and R2, than across R4, there is a substantial increase in the positive pulse that is effective upon the gate G. The composite effect operates automatically to increase the conductivity time because less of the effective pulse curve is absorbed in the capacitor charge and discharge time, more of it reaches the gate through the slider and resistance R3. Increase of the positive pulse at common connection 17 is great enough upon the gate to be equivalent to moving the slider closer to F.

In fact, it appears that with the slider 23 moving towards F, the effect of the capacitor is gradually superceded with the pulsing current provided through resistors R1, R2 and R3.

The capacitor C1 merely provides a negative effect upon the signal system of variable duration from 0 to 70% of top speed. Without the capacitor C1 present, the A.C. through resistor R1 would control the firing at 70% to 100% of top speed. Accordingly, if either are rendered ineffective, there is still some load-speed control in connection with resistors R2 and R4 as controlled by R3.

At top speeds, the gate is nonconducting only during the null points of the full wave rectification received through R2. What occurs with the sine wave at higher speeds is of diminished importance because of the higher resistance present in resistor R1 as compared to R2. This speed change potential is under the manual control of the slider 23.

Referring now to the variable resistor R5, this resistor is provided to orient the composite resistance of R3 and R5 effective between the sensing circuit 17 and the gate G so that the speed of the motor will come wthin that calibrated for movement of the slider 23. This accommodates variations in the characteristics of solid state controlled rectifiers employed in assemblying embodiments of the invention and also variations in motor speed characteristics of motors with which they will be employed.

In this connection, the neon lamp 13 will glow when the adjustment of resistor R5 begins to fire the controlled rectifier with a still motor.

It should also be noted that the solid state controlled rectifier is of the PNPN type which can be purchased on the open market in relation to current carrying capacity desired. In event a NPNP type is employed, connections to the positive and negative poles of the rectifying loop need only be reversed along with the polarity of capacitor C1.

For the assistance of explanation, the oscilloscope curve patterns with the probes bridging the motor 10 are shown in FIG. 3 at five speeds. Current flows when the sine wave form appears.

Having thus described a preferred embodiment of the invention and its novel theory of operation along with modifications, it will be readily seen by those skilled in the art how the stated objects and results are attained and how various modifications and changes can be incorporated without departing from the spirit of the invention, the scope of which is commensurate with the appended claims.

What is claimed is:

1. In an electrical control system, the combination of a solid state controlled rectifier having emitter, collector and gate connections, a variable speed motor adapted to run on electrical current having regularly recurring null points of a value less than the minimum holding current rating of said controlled rectifier, a rectification bridge including unidirectional rectifiers providing two alternating current terminals connected in series with the motor and two poles providing full wave rectified current of opposite polarity between them, said controlled rectifier having its emitter and collector connections connected across said poles, a current sensing circuit including two resistors of different values connected in series across said two poles and having a connection in common between them, a third resistor interconnecting said common connection and the gate of said controlled rectifier, said other one of said two resistors and said third resistor providing a proportional pulse for firing said gate between the null points, and said lower value resistor and said capacitor providing a charge and discharge whose component charging and discharging delays by nullification the effective firing of said gate in relation to current flow through the motor.

2. The combination called for in claim 1 including a filter capacitor bridging said motor for filtering the counter E.M.F. and inductive surges occurring in the motor during speed controlled operation.

3. The combination called for in claim 1 including a secondary variable speed control resistance bridging said variable resistance for adjusting the resistive speed adjustment range of the variable resistance to power line voltages and to the electrical characteristics of the motor.

4. In an electrical control system, the combination of silicon controlled rectifier having anode, cathode and gate connections, a variable speed series wound universal motor adapted to run on electrical current having regularly recurring null points of a value less then the minimum gate holding current rating of said controlled rectifier, a rectification bridge including diodes providing two alternating current terminals connected in series with the motor and two intermediate poles providing full wave rectified current of opposite polarity between them, said controlled rectifier having its anode and cathode connections connected across said poles, a current sensing circuit including two resistors of different values in the approximate ratio of three to four connected in series across said two poles and having a connection in common beween them with the one of higher value being connected to the positive pole, a third resistor having a resistance value twice the value of the lower of said two resistors, interconnecting said common connection and one of said terminals to apply alternating current to said common connection, a capacitor connected across said resistor having the lower resistance value, and a variable resistor interconnecting said common connection and the gate of said controlled rectifier of a value of approximately one-half the value of said higher value resistor, said higher value resistor and said third resistor providing an essentially half wave rectification pulse for firing said gate between the null points at low motor speeds, and said lower value resistor and said capacitor providing a charge and discharge component whose charging and discharging effect upon said gate in a negative one diminishing with higher motor speeds to delay the effective firing of said gate in relation to current flow through the motor.

5. In an electrical control system, the combination of a solid state controlled rectifier having anode, cathode and gate connections, a variable speed universal motor adapted to run on electrical power current having regularly recurring null points of a value less than the minimum holding current rating of said controlled rectifier, a rectification bridge including rectifiers providing two alternating current terminals connected in series with the motor and two poles of opposite polarity through which the power current flows as rectified current having regularly recurring null points, said controlled rectifier having its anode and cathode connections connected across said poles to control the flow of power current, said null points of power current rendering the controlled rectifier nonconductive a current sensing circuit including two resistors connected serially across said two poles in parallel with said controlled rectifier to conduct rectified current when the controlled rectifier is nonconducting and having a connection in common between them a variable resistor interconnecting said common connection and the gate of said controlled rectifier for applying the pulses of the rectified current to fire the gate a capacitor connected across the resistor having the lower resistance value, said lower value resistor and said capacitor being responsive to the resultant power factor of the forward current opposed by counter E.M.F. in the motor to provide a charge and discharge component whose charging and discharging has a polarity effect opposing the firing of the gate to delay in point of time the effective firing of said gate in relation to current flow through the motor.

6. The combination called for in claim 5 including a filter capacitor bridging said motor for filtering the counter E.M.F. and inductive surges occurring in the motor during speed controlled operation.

7. In an electrical control system, the combination of a solid state controlled rectifier having anode, cathode and gate connections, a variable speed universal motor adapted to run on electrical current having regularly recurring null points of a value less than the minimum holding current rating of said controlled rectifier, a rectification bridge including unidirectional rectifiers providing two alternating current terminals connected in series with the motor and two poles providing full wave rectified current of opposite polarity between them, said controlled rectifier having its anode and cathode connections connected across said poles, a current sensing circuit including two resistors of different values connected in series across said two poles and having a connection in common between them, to supply a full wave rectified pulsating current component to control the speed of the motor in its upper speed range, a third resistor interconnecting said common connection and a source of alternating current to supply an alternating current component to control the speed of the motor in its lower speed range, and a variable resistor interconnecting said common connection and the gate of said controlled rectifier, said other one of said two resistors and said third resistor providing a proportioned pulse for firing said gate between the null points, and means responsive to the forward current and counter E.M.F. of the motor when said controlled rectifier is nonconducting to delay the effective firing of said gate through said variable resistance.

8. A variable speed control for a universal motor adapted to run on electrical current having regularly recurring null points comprising a solid state controlled rectifier having anode, cathode and gate connections a rectification bridge including unidirectional rectifiers providing two alternating current terminals for connection in series, the motor circuit and two poles providing rectified direct current of opposite polarity between them, said controlled rectifier having its anode and cathode connections connected across said poles to control the flow of power current, a current sensing circuit including two resistors connected in series across said two poles and having a connection in common between them to supply a pulsing direct current to said common connection, a third resistor interconnecting said common connection and a source of alternating current to supply an alternating current component to said common connection, and a variable resistor interconnecting said common connection and the gate of said controlled rectifier to provide a proportioned pulse for firing said gate between the null points of the rectified direct current, and means responsive during said null points when said controlled rectifier is nonconducting to delay the effective firing of said gate through said variable resistance.

9. A variable current control for an electrical load utilizing an electrical current having regularly recurring null points comprising a solid state controlled rectifier having anode, cathode and gate connections, a source of alternating current having a voltage drop between two terminals and a negative neutral pole, a plurality of unidirectional rectifiers having their anodes connected separately to said terminals and a low resistance connection between their cathode terminals and said anode connection to provide same with a full wave rectified current having a positive potential, means connecting said load in series with said cathode connection and neutral pole, a current sensing circuit including two resistors connected in series between one of said terminals and said anode connection and having a connection in common between them, a variable resistance between said common connection and said gate, said variable resistance providing a proportioned pulse for firing said gate between the null points of the rectified current, and capacitor means responsive during said null points when said controlled rectifier is nonconducting to delay the effective firing of said gate through said variable resistance.

10. The combination called for in claim 9 in which said negative neutral pole comprises a common connection between the anodes of a plurality of rectifiers whose cathodes are separately connected to said two terminals.

11. The combination called for in claim 9 in which said responsive means comprises a resistor and electrolytic capacitor connected in parallel with each other and between said cathode connection and said common connection between said two resistors.

References Cited

UNITED STATES PATENTS

| | | | |
|---|---|---|---|
| 2,850,694 | 4/1958 | Hamilton | 323—38 X |
| 3,165,688 | 1/1965 | Gutzwiller | 318—345 X |
| 3,171,074 | 2/1965 | Momberg et al. | 318—345 X |
| 3,195,029 | 7/1965 | Gilbreath | 318—345 X |
| 3,202,899 | 8/1965 | Gambill et al. | 318—345 X |
| 3,271,648 | 9/1966 | Weed | 318—345 X |
| 3,316,472 | 4/1967 | Taylor | 318—345 X |

ORIS L. RADER, *Primary Examiner.*

G. SIMMONS, *Assistant Examiner.*